Patented Aug. 6, 1946

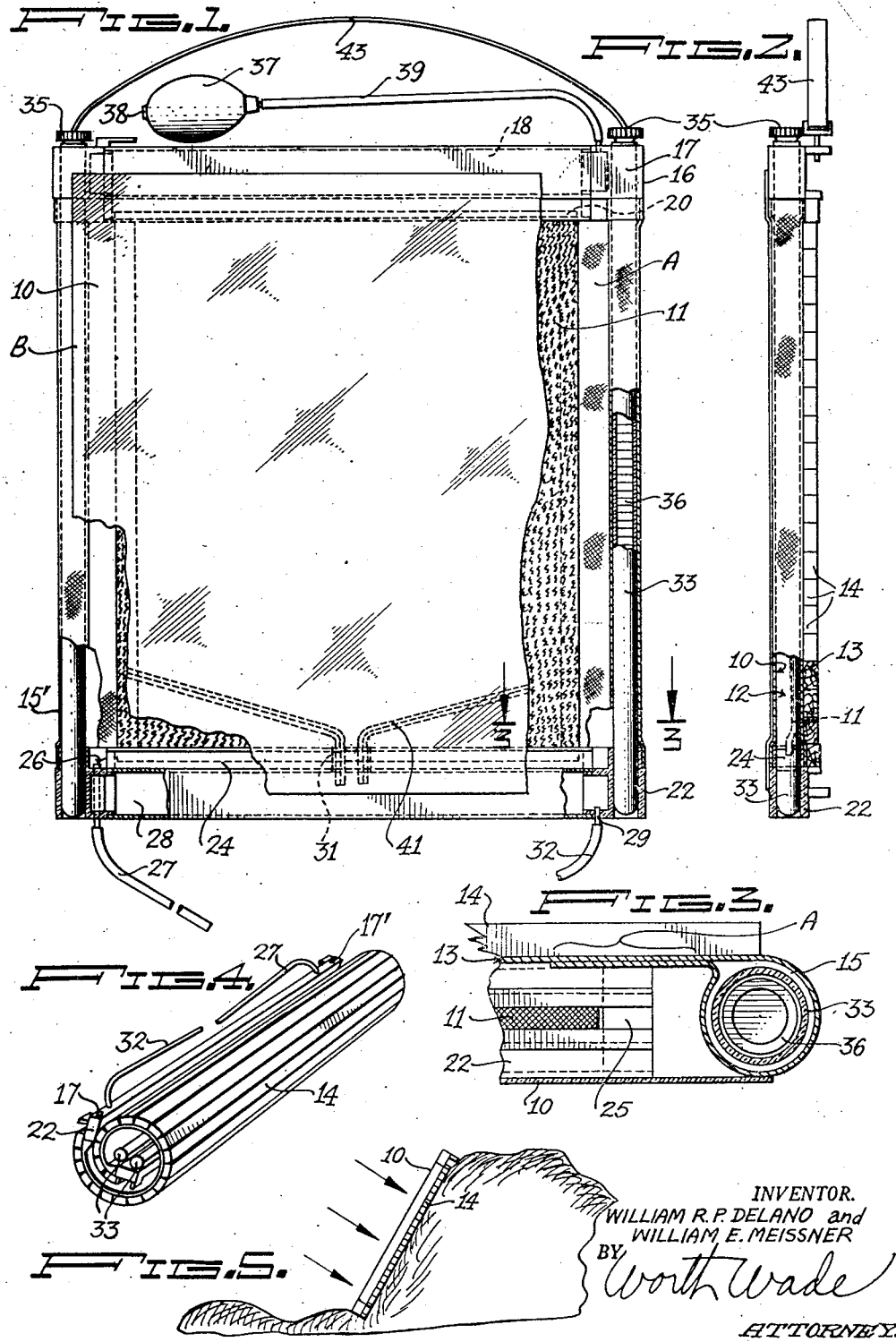

2,405,118

UNITED STATES PATENT OFFICE 2,405,118

SOLAR DISTILLATION APPARATUS

William R. P. Delano, Syosset, N. Y., and William E. Meissner, Newark, N. J., assignors to Gallowhur Chemical Corporation, New York, N. Y., a corporation of Vermont Application August 30, 1943, Serial No. 500,550

9 Claims. (Cl. 202—234)

This invention relates in general to distillation and in particular to an apparatus for distilling liquids, in particular sea water, and to correlated improvements designed to render such an apparatus collapsible and portable.

The need of a simple and convenient method of distilling impure water, such as sea water, for the production of fresh water for drinking and the like has long been recognized, but this need becomes increasingly important during times of war when the destruction of ships and airplanes at sea forces the crews to take to lifeboats, rafts and floats. In such small lifesaving craft space is limited, methods of heating either non-existent or difficult to provide and all weight must be reduced to a minimum. Accordingly, any apparatus for distilling sea water to produce fresh water for drinking on lifesaving craft must meet, inter alia, the following stringent requirements:

1. The device must have a relatively low weight per unit of capacity. For example, when the apparatus is to be carried in aircraft and is to be used in a small rubber boat adapted only to carry two men, the weight of the distilling device should not exceed about twelve pounds and the capacity should be about two quarts per day.

2. Equally important as the weight is the space limitations involved in the transportation and in the use of the apparatus. The device must be compact and occupy a small space when not in use, i. e., when it is carried in an airplane, and when in use, it must be capable of efficient operation without occupying the space which would otherwise be available for an occupant of the lifesaving craft.

3. The device must be resistant to corrosion by sun, air, water and the action of the salts contained in sea water. It must also be fabricated of such material as will resist the rough handling incident to setting up and operating the apparatus under adverse weather conditions in crowded lifesaving craft.

4. The device should be capable of being erected without tools and by unskilled persons, and should be simple of operation.

5. The apparatus should be capable of being fabricated without the use of critical or scarce war material, such as metals, plastics and the like.

6. The device should operate upon a source of cheap, plentiful fuel without the use of an open flame which would create a fire hazard. It has long been realized that a plentiful source of fuel at sea is solar radiation for, under the most adverse weather conditions, there will be, on the average, several hours of sunlight per day in those areas of the ocean which are navigable and free from ice.

7. The fresh water produced should be free of salts, of harmful bacteria and should be substantially odorless and tasteless.

Accordingly, it is the general object of the present invention to provide an apparatus for the distillation of liquids, in particular, sea water which will satisfy the objects above described and meet the specifications recited.

It is a further object of the invention to provide a simple means for distilling sea water which is adapted for use on small lifesaving craft.

It is a further specific object to provide an apparatus for distilling sea water which will be collapsible, compact and light in weight, so that it can be carried in airplanes and installed as regular equipment in small lifesaving craft.

Other objects of the invention will in part be obvious and will in part appear hereinafter.

According to the present invention, there is provided an apparatus for distilling liquids, in particular sea water, for the production of fresh water, comprising, in combination, a layer of absorbent material spaced from a sheet of transparent, flexible, impermeable material and supported by a multiplicity of rigid slats which are adhered with edges abutting to a layer of flexible, impermeable material and stiffened by dowels at opposite edges of said layers so that upon the removal of the dowels the device will be rolled upon itself with a transparent layer inside.

In the now preferred embodiment, the apparatus comprises, in combination, a layer of absorbent material united on one side to a sheet of flexible water-impermeable material and spaced on the opposite side from a window formed of a sheet of transparent water-impermeable material, the assembled sheets being stretched on two sides by stiff rods and stretched at right angles to said rods by means of a plurality of slats which are united, with edges abutting, to the back of the sheet of waterproof material, a header for distributing liquid to one end of the absorbent layer and a reservoir arranged and disposed to collect water flowing down the transparent window.

For a more complete understanding of the nature and the objects of the invention, reference should be had to the accompanying drawing in which, Figure 1 is a front elevation, partly in section, of one embodiment of the apparatus of the invention, Figure 2 is a side elevation, partly in section, of the apparatus of Fig. 1, Figure 3 is a fragmentary cross-sectional view taken along the line 3—3 of the apparatus of Fig. 1, Figure 4 is a perspective of the apparatus, after collapsing and rolling, and Figure 5 illustrates one position of the apparatus when in use.

Referring to Fig. 1, the device comprises a portable and collapsible distillation unit which is shown as rectangular but may have any shape. The unit comprises a transparent flexible window 10, a flexible layer 11 of water-absorbent material spaced from the window so as to leave an air space 12, and a collapsible backing comprising a sheet 13 of flexible water-impermeable material to which is adhered a multiplicity of separate slats 14 of stiff material such as wood, metal or plastic. The slats 14 are adhesively united to the sheet 13 but not to each other so that the sheet 13 may be rolled upon itself but can not be rolled outward. The side of sheet 13 is curved outward and adhered to itself along the area A to provide vertical sleeves 15 and 15' at the side edges of the device. The header 16 is formed of a rigid liquid-impermeable material and comprises slots 17 and 17' adjacent each end corresponding to the sleeves 15 and 15' and a liquid reservoir 18 having a longitudinal slot 19 along the base through which extends the upper edge 20 of the absorbent layer 11, which edge is folded to anchor it in the slot. The upper edge of the backing sheet 13 extends over and is sealed to the base of the header 16. The window sheet 10 extends over and is sealed to the base and to the front of the sleeves 15 and 15' along the areas B. The base 22 comprises a rigid structure having holes 17 and 17' positioned to coincide with the sleeves 15 and 15', an upper elongate reservoir 24 having a longitudinal slot 25 in the top through which extends the lower edge of the layer 11 of absorbent material. Liquid is discharged from this reservoir 24 through the rigid tube 26 and the flexible tube 27 which is provided with a pinch clamp or bead valve of conventional type. The lower reservoir 28 communicates through the rigid tube 31 with the air space 12, and liquid is discharged through the pipe 29 and the flexible tube 32 which is also provided with a suitable pinch clamp or bead valve. The lower edges of the backing sheet 13 and of the window 10 extend over and are sealed to the outside of the base 22. To impart rigidity to the device there are provided rigid battens or rods 33 and 33' which are slipped into the sleeves 15 and 15'.

In the now preferred embodiment the rods 33 and 33' are hollow elongate tubes, each having a closed bottom 34 and a screw cap 35, the interior being adapted to be filled with a food or medicinal 36 such as vitamin pills, aspirin tablets or tablets of dried or concentrated foods or with liquid foods or medicines.

Upon removal of the rods 33, the device may be rolled upon itself with the transparent window 10 on the inside so as to form a compact collapsed unit as illustrated in Fig. 4, the rods 33 being placed in the center of the roll. The entire device may be packaged in a suitable container to prevent damage or deterioration by the atmosphere.

To place the apparatus in use, the rolled device shown in Fig. 4 is unrolled and the tubes or rods 33 and 33' are slipped into sleeves 15 and 15' to the position shown in Figs. 1 and 2. The liquid to be distilled is then drawn into the bulb 37, through the one-way valve 38. By pressing the bulb 37, the liquid contained therein is forced through the flexible tube 39 into the header 16 until the reservoir 18 is filled with the liquid to be distilled. The liquid wets the upper edge 20 of the absorbent layer 11 and the liquid then flows by capillary action down the absorbent layer until the layer is fully saturated with the liquid. Any excess liquid from the layer 11 will drip into the lower reservoir 24 and may be discharged through the tubes 26 and 27. The apparatus is then disposed so that the transparent window 10 is normal to the sun's rays, for example, by leaning the apparatus against a sand dune as shown in Fig. 5, or by otherwise positioning the apparatus. Radiation from the sun passing through the transparent window will increase the temperature of the absorbent layer to such a point that the liquid is evaporated therefrom into the air space 12. The vapor condenses on the inner surface of the window 10 and flows down the inner surface of this window and collects in the gutter 41 and flows through the tube 31 into the lower reservoir 28 from which the distilled liquid is discharged through the pipe 29 and the flexible tube 32 as needed.

If the device shown in Fig. 1 has a transparent sheet which is one square foot in area, it will produce per day in average sunlight one quart of distillate. When the device is formed of lightweight fabric and wood as above described, such device will weigh about one pound.

If desired, the device shown in Fig. 1 may be provided with a long strap 43 at the top adapted to be passed around the neck of a person. The device may be positioned on the back of a person, in which case it is preferably spaced from the body by means of a life preserver or wad of clothing to avoid the body heating the condensing chamber.

Alternatively, a foldable rack (not shown) of metal or wood for supporting the device in any desired position may be readily devised by anyone skilled in the art without transcending the scope of the invention.

In the now preferred embodiment, all sheet materials employed in the apparatus are flexible sheets so that the apparatus may be collapsed and rendered compact for shipment or storage. When the battens 33 are removed, the back section 11 may be collapsed against the front section 10 and the two sections rolled upon each other starting with the top so that the slats 14 form a supporting means for the roll. The rolled apparatus may be encased in a container or carrying case of suitable type, not herein illustrated.

It will be apparent from the above detailed description that the apparatus comprises three main elements and several optional but desirable elements. The essential elements are (1) the transparent window, (2) the absorbent material, and (3) the shaping means, i. e. the means by which the article is given form and rigidity and proper disposition of the absorbent layer with respect to the window. Each of these elements will be described in detail hereinafter.

*The transparent window*

The sheet 10 of transparent material shown in the apparatus of Fig. 1 should be a flexible but form-retaining sheet of any suitable transparent hydrophobic material, such, for example, as a cellulose ester, a cellulose ether, or a synthetic resin. Preferably, there is employed for this sheet material a transparent plastic which is permeable to visible and infra-red radiation such, for example, as cellulose acetate and cellulose aceto-butyrate. It is to be understood that the transparent sheet shown in Fig. 4 is employed solely for trapping a layer of warm air next to the surface of the water-absorbing layer 11. If desired, the layer 11 may also be spaced from the backing sheet 13 so that evaporation can take place from both the front and rear surfaces of the layer 11.

Since the transparent window divides the warm moist air of the interior from the cool dry air on the outside of the window, there will be normally a tendency of the window to become fogged by the condensation of droplets of water on the inner surface. Such droplets diffuse the light and decrease the radiation absorbed by the layer of absorbent material. Accordingly, it is desirable to retard or prevent fogging of the transparent window. This may be accomplished by forming the window of a transparent material combined on one or both sides with a layer of water-absorbent, that is hydrophilic material, which absorbs the condensed water and prevents it from remaining as individual droplets. For example, when the sheet of transparent material is formed of a saponifiable material, such for example, as a cellulose ester or a synthetic resin formed from an ester such as vinyl acetate, vinyl chloride, methylmethacrylate, and glycerol-polybasic acid resins, such saponifiable materials may be superficially saponified by treatment with an inorganic alkali or an organic base to form a superficial layer of hydrophilic material. Alternatively, when the transparent window is formed of a non-saponifiable material, it may be coated with a hydrophilic film-forming material, such, for example, as viscose, gelatine, casein, polyvinyl alcohol, or the like, or it may be coated with a saponifiable material and the coating then saponified. Alternatively, the window may be laminated on the interior and/or exterior to a self-sustaining film formed of a hydrophilic transparent material, such, for example, as Cellophane, gelatine, polyvinyl alcohol sheeting, and the like, the film being adhesively united to the transparent window by a suitable water-insoluble adhesive. Saponification may be in predetermined areas by masking the areas which are not to be saponified by means of a layer of paraffin which resists the saponification.

The absorbent layer

For the layer 11 of absorbent material, there may be employed a layer of viscose sponge, pile fabric, a layer of inter-felted fibres such, for example, as textile felt or a soft, porous paper which has been sized with a water-insoluble substance such, for example, as casein, a resin or a cellulose ester which does not disintegrate when wet. Since layer 11 should be capable of being washed and wrung out, it is preferably formed of a material having a sufficient tensile strength for this purpose, that is, a textile fabric or felt, or sponge.

The absorbent layer is preferably colored black to render it more heat-absorbent and this may be done by dyeing or pigmenting the absorbent material with a suitable black dye or carbon black. To insure that the fresh water is free of harmful bacteria, the absorbent layer is advantageously rendered bacteriostatic or fungistatic and germicidal by combining it, e. g. by impregnation or coating, with a suitable water-insoluble germicide such, for example, as a phenyl mercury compound, finely divided ionized heavy metals, such as silver, copper or gold, or by means of an organic substantially water-insoluble germicide such, for example, as copper naphthenates, phenyl mercury chloride, phenyl mercury hydroxy quinoline, and dichlorodihydroxymethane.

All other parts of the apparatus, such as the base sheet 13, may be formed of any flexible non-porous sheet material such, for example, as textile fabrics, felt or paper. Such materials should be stiffened and rendered waterproof by impregnating or coating them with an hydrophobic cellulose ester, cellulose ether, synthetic resin and the like. In general, all such sheet materials should be water impermeable.

The transparent window 10 is formed of a transparent organic plastic material and the backing sheet 13 is rendered water-impermeable by coating it with an organic plastic material. Since most organic plastic materials contain residual volatile solvents or volatile plasticizers, they tend to undergo changes in dimension when subjected to such temperatures as are generated by the sun's rays. Therefore, in the now preferred embodiment, the sheet materials, before or after being incorporated in the device, are subjected to a preshrinking treatment. The preshrinking is accomplished by subjecting the sheets or the apparatus incorporating such sheet materials to an elevated temperature sufficient to drive out the major proportion of the residual volatile solvents or volatile plasticizers so that these materials are given a dimensional stability. For example, if the transparent window is made of cellulose acetate butyrate and the backing sheet is made of a fabric coated with cellulose acetate butyrate, these sheet materials or the device incorporating them is baked at a temperature of 180° F. until there occurs no further change in the dimensions of such materials and the materials so treated may be considered as preshrunk. An apparatus incorporating such preshrunk materials may then be exposed to the sun's rays without causing a shrinkage of the transparent window 10 or the backing sheet 13 as a result of which the tendency of the apparatus to brittle or warp under the influence of the sun's rays is substantially prevented.

The shaping means

The rigid header 16 and the rigid base 22 give transverse strength and rigidity to the apparatus while the tubes 33 which slip into the sleeves 15 and 15' give rigidity and strength vertically. The slats 14 also impart rigidity when the tubes 33 are in position in the sleeves. By means of the members just described all of the sheet materials are extended in a flat plane and the transparent window is made taut.

It is understood that various changes can be made in the apparatus and in its mode of operation. In particular, for stabilizing the shape of the device when it is made largely of flexible non-rigid material, suitable folding frames of wire or wood may be readily devised by those skilled in the art without transcending the scope of the invention. More or less permanent frames may be readily devised from flag poles, lances, bayonets, rifles, boat hooks and other available rigid members. To facilitate the use of such framing elements, the device is preferably provided with strong cords or tapes sewn at the corners so that the device may be stretched upon the rigid frame. It is obvious that the device is not limited to any particular size, nor is it limited to use at sea or in life-saving craft, but may likewise be used in the desert or anywhere for the distillation of non-potable water of all kinds.

Accordingly, the present invention provides for the first time a light-weight portable distillation apparatus which can be fabricated free of scarce metals and plastics so that the weight per unit of capacity can be kept extremely low, for example, to less than 2 pounds per quart of liquid distilled in 12 hours. The present device is small in size, readily collapsible to a compact unit and easily reconstructed without tools or mechanical skill. The device is especially adapted to be carried in aircraft as a part of the regular equipment of emergency life-saving rafts or floats. Since it may be fabricated of plastics or coated fabrics or paper and the like, it is resistant to corrosion and withstands rough handling. The fact that it requires no solid, gaseous or liquid fuel makes it economical to carry and operate and does not create a fire hazard in storage or in use.

We claim:

1. In an apparatus for distilling liquids, the combination of a layer of absorbent material united on one side to a sheet of flexible water-impermeable material a window formed of a sheet of transparent water-impermeable material and spaced from the opposite side of said absorbent material, the assembled sheets being stretched on two sides by stiff rods and stretched at right angles to said rods by means of a plurality of slats which are united, with edges abutting, to the back of the sheet of waterproof material, a header for distributing liquid to one end of the absorbent layer and a reservoir arranged and disposed to collect water flowing down the transparent window.

2. An apparatus according to claim 1 in which the rods comprise elongated tubes having one closed end and means to seal the other end.

3. In a collapsible solar distillation apparatus, a sheet of flexible absorbent material, a sheet of flexible transparent material located adjacent one face of said absorbent material, a sheet of flexible impervious material located adjacent the opposite face of said layer of absorbent material and cooperating with said sheet of transparent material to form an enclosure for said sheet of absorbent material, means for holding said sheets of material in spaced relation and in extended positions including a plurality of rigid elements arranged parallel to each other and connected to the exterior of one of said sheets, at least one rigid element movably connected to said parallel elements and extending transversely thereof to hold the sheets extended, and means for supplying said sheet of absorbent material with liquid to be distilled.

4. A collapsible solar distillation device comprising a sheet of flexible absorbent material, a sheet of flexible impervious backing material extending parallel to one face of said absorbent sheet, a sheet of flexible impervious transparent material extending parallel to the opposite face of said absorbent sheet and cooperating with said backing material to form an enclosure for said absorbent sheet, means for supplying liquid to be distilled to said absorbent sheet, means connected to the edges of said sheets for holding said absorbent sheet spaced from one of the other sheets, and means for holding said sheets extended including a plurality of rigid members attached to one sheet and arranged in parallel relation and a rigid rod removably engaging each of said parallel rigid members to hold them in a single plane.

5. A collapsible solar distillation device comprising a layer of flexible absorbent material located between two sheets of flexible impervious material, said sheets being connected at their edges to form an enclosure for said absorbent material and at least one of said sheets being transparent and spaced from said absorbent material, means for supplying liquid to be distilled to said absorbent material, means for withdrawing distillate from said device, a plurality of elongated and parallel rigid members connected to one of said sheets and extending transversely thereof to hold said sheets extended in one direction while permitting said sheets to be rolled in a direction at right angles thereto for storage, and a rigid and substantially straight member removably connectable to said parallel members to hold said members in substantially a single plane and thereby hold said sheets and absorbent material in extended positions for use.

6. A collapsible solar distillation apparatus comprising a layer of flexible absorbent material, a member connected to the upper edge of said absorbent material for supplying the same with liquid to be distilled, a sheet of flexible impervious backing material secured to one face of said absorbent material and extending beyond the vertical edges thereof, a sheet of flexible transparent material located on the opposite face of said absorbent material and spaced therefrom, said transparent sheet being secured at its edges to said member and impervious sheet to form an enclosure for the absorbent material, means closing the lower portion of said enclosure and formed to receive distillate produced, a plurality of parallel rigid members secured to the outer face of said impervious sheet of backing material and extending between the vertical edges thereof whereby the apparatus may be rolled about said parallel members into a collapsed form, and rigid means adapted to be connected vertically to said parallel members to hold said apparatus extended.

7. In a collapsible solar distillation apparatus a sheet of flexible absorbent material, a sheet of flexible transparent material located adjacent one face of said absorbent material, a sheet of flexible impervious material located adjacent the opposite face of said layer of absorbent material and cooperating with said sheet of said transparent material to form an enclosure for said sheet of absorbent material, means for supplying liquid to be distilled to said absorbent sheet and means for holding said sheets of material in spaced relation and in extended positions including a plurality of rigid elements arranged parallel to each other and connected to the exterior of one of said sheets, loops of material adjacent the edges of said sheets and near the ends of said rigid elements and rigid members movable through said loops of material and engageable with said rigid elements for holding said sheets extended.

8. In a collapsible solar distillation apparatus a sheet of flexible absorbent material, a sheet of flexible transparent material located adjacent one face of said absorbent material, a sheet of flexible impervious material located adjacent the opposite face of said layer of absorbent material and cooperating with said sheet of said transparent material to form an enclosure for said sheet of absorbent material, means for supplying liquid to be distilled to said absorbent sheet and means for holding said sheets of material in spaced relation and in extended positions including a plurality of rigid elements arranged parallel to each other and connected to the exterior of one of said sheets, said elements having their edges substantially in contact when said sheets are extended, and rigid means engageable with said elements to hold said sheets extended.

9. In a collapsible solar distillation apparatus a sheet of flexible absorbent material, a sheet of flexible transparent material located adjacent one face of said absorbent material, a sheet of flexible impervious backing material located adjacent the opposite face of said layer of absorbent material and cooperating with said sheet of said transparent material to form an enclosure for the absorbent material, means for supplying liquid to be distilled to said absorbent material, and means for holding said sheets of material in spaced relation and in extended positions including a plurality of rigid elements arranged parallel to each other and connected to the exterior of the sheet of backing intermediate the ends thereof, other rigid end members located adjacent the ends of the backing sheet and formed with openings therein, loops of material adjacent the edges of said sheets and near the ends of said intermediate rigid elements, and rigid holding members movable through said loops of material and engageable with the openings in the ends of the rigid end members for holding said sheets extended.

WILLIAM R. P. DELANO.
WILLIAM E. MEISSNER.